(12) United States Patent
Malkov et al.

(10) Patent No.: US 10,925,098 B2
(45) Date of Patent: Feb. 16, 2021

(54) APPARATUS AND METHOD FOR TRANSMITTING TWO OR MORE PREAMBLES PER RACH ATTEMPT

(71) Applicant: HUAWEI TECHNOLOGIES CO., LTD., Guangdong (CN)

(72) Inventors: Andrei Malkov, Moscow (RU); Bo Xu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/422,676

(22) Filed: May 24, 2019

(65) Prior Publication Data
US 2019/0281627 A1    Sep. 12, 2019

Related U.S. Application Data

(63) Continuation of application No. PCT/RU2016/000819, filed on Nov. 28, 2016.

(51) Int. Cl.
*H04W 74/08* (2009.01)
*H04W 72/08* (2009.01)
(Continued)

(52) U.S. Cl.
CPC ......... *H04W 74/085* (2013.01); *H04L 1/08* (2013.01); *H04W 72/087* (2013.01); *H04J 13/0062* (2013.01)

(58) Field of Classification Search
CPC ................ H04W 74/085; H04W 72/087
See application file for complete search history.

(56) References Cited

U.S. PATENT DOCUMENTS

2010/0002590 A1* 1/2010 Park ............... H04W 74/006
370/241
2018/0205516 A1* 7/2018 Jung ............ H04W 74/0833
(Continued)

FOREIGN PATENT DOCUMENTS

CN    101674661 A    3/2010

OTHER PUBLICATIONS

3GPP TS 36.211 V14.0.0 (Sep. 2016);3rd Generation Partnership Project;Technical Specification Group Radio Access Network;Evolved Universal Terrestrial Radio Access (E-UTRA);Physical channels and modulation(Release 14);total 170 pages.
(Continued)

*Primary Examiner* — Jamal Javaid
(74) *Attorney, Agent, or Firm* — Womble Bond Dickinson (US) LLP

(57) ABSTRACT

Apparatus and methods for transmitting a preamble in a random access procedure are described herein. A user terminal may transmit two or more preambles to access a base station, for example, on a selected random access channel (RACH) in a contention-based random access procedure. The user terminal receives a random access response (RAR) from the base station, for example, on PDCCH, wherein the RAR is a response of the preambles transmitted by the transmitter. More than one preamble is transmitted by the user terminal in a contention-based random access procedure. In this way, the user terminal has a lower probability of transmitting the same preambles that other user terminals have transmitted. This helps the user terminal efficiently avoid a collision with other user terminals in the random access procedure. The user terminal therefore has a higher probability of a successful access.

20 Claims, 15 Drawing Sheets

(51) Int. Cl.
*H04L 1/08* (2006.01)
*H04J 13/00* (2011.01)

(56) References Cited

U.S. PATENT DOCUMENTS

2019/0110300 A1* 4/2019 Chen ................ H04W 74/04
2019/0223214 A1* 7/2019 Jiang ................ H04L 5/0094

OTHER PUBLICATIONS

3GPP TS 36.321 V14.0.0 (Sep. 2016);3rd Generation Partnership Project;Technical Specification Group Radio Access Network;Evolved Universal Terrestrial Radio Access (E-UTRA);Medium Access Control (MAC) protocol specification(Release 14);total 96 pages.
CATT,"On-demand System Information Delivery Mechanism",3GPP TSG RAN WG2 Meeting #95 R2-164811,Gothenburg, Sweden, Aug. 22-26, 2016,total 6 pages.
Stefania Sesia et al.,"LTE—The UMTS Long Term Evolution From Theory to Practice", Second Edition; Wiley,2011,total 794 pages.
ZTE Corporation et al.,"Random access preamble structure and signaling",3GPP TSG RAN WG1 Meeting #87 R1-1611271,Reno, USA, Nov. 14-18, 2016,total 6 pages.
ZTE et al.,"Overview of NR initial access",3GPP TSG RAN WG1 Meeting #87 R1-1611272,Reno, USA, Nov. 14-18, 2016,total 4 pages.

* cited by examiner

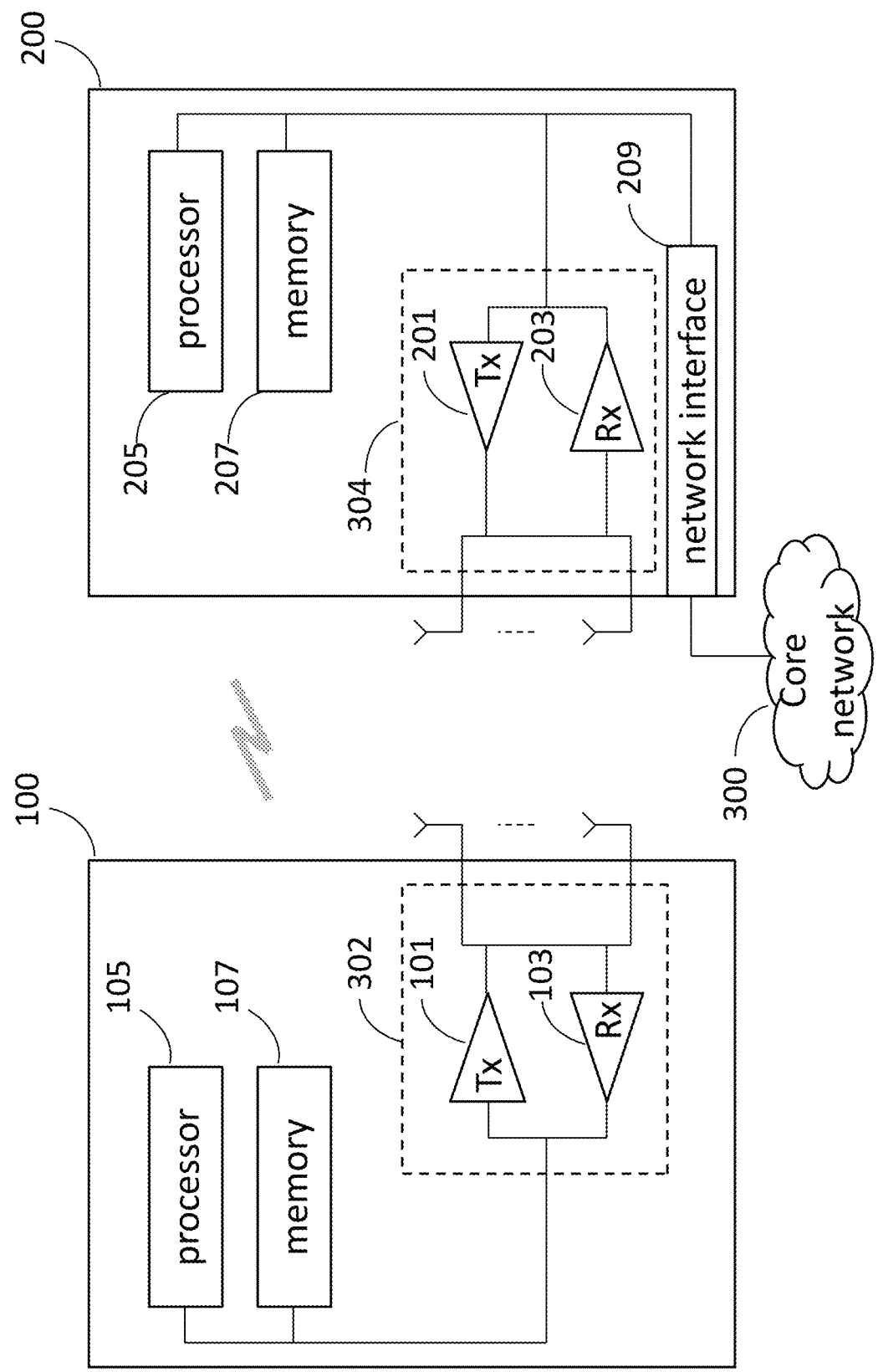

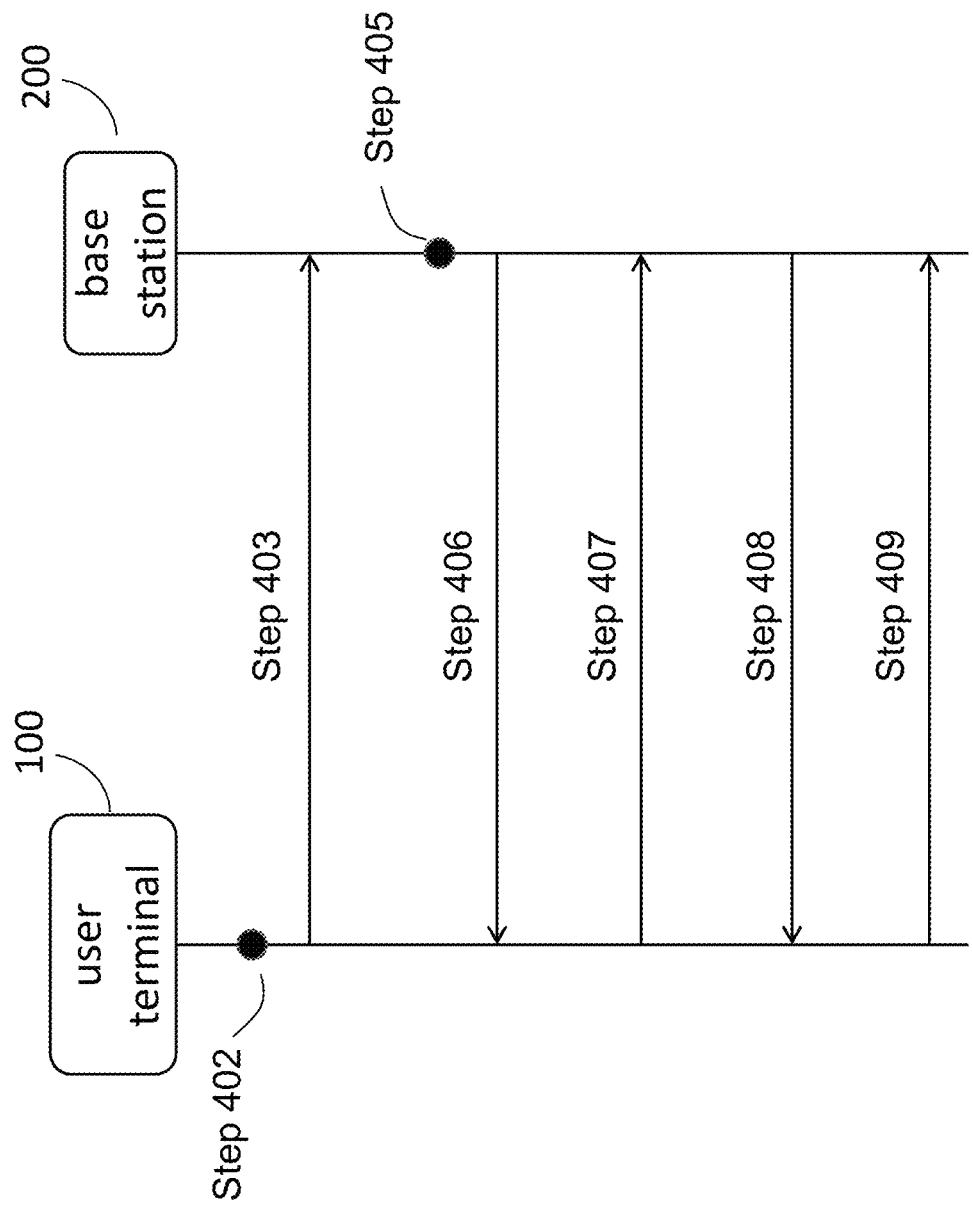

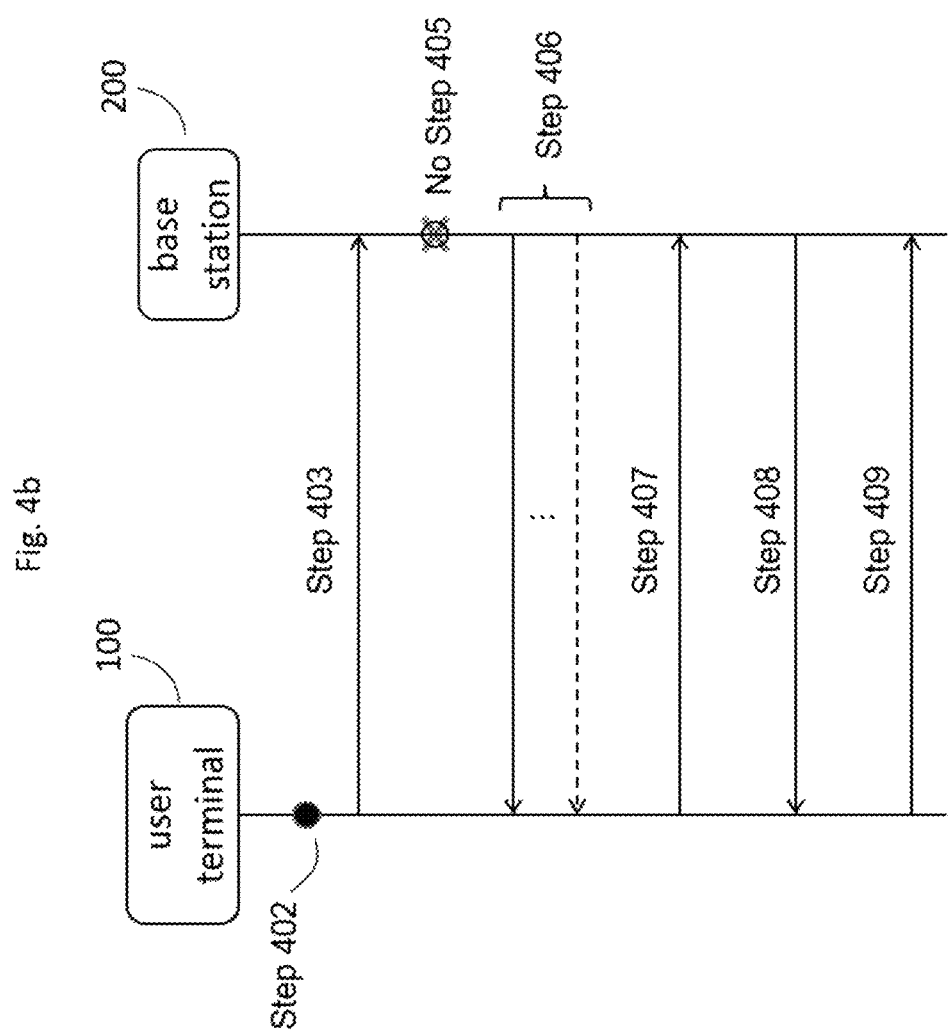

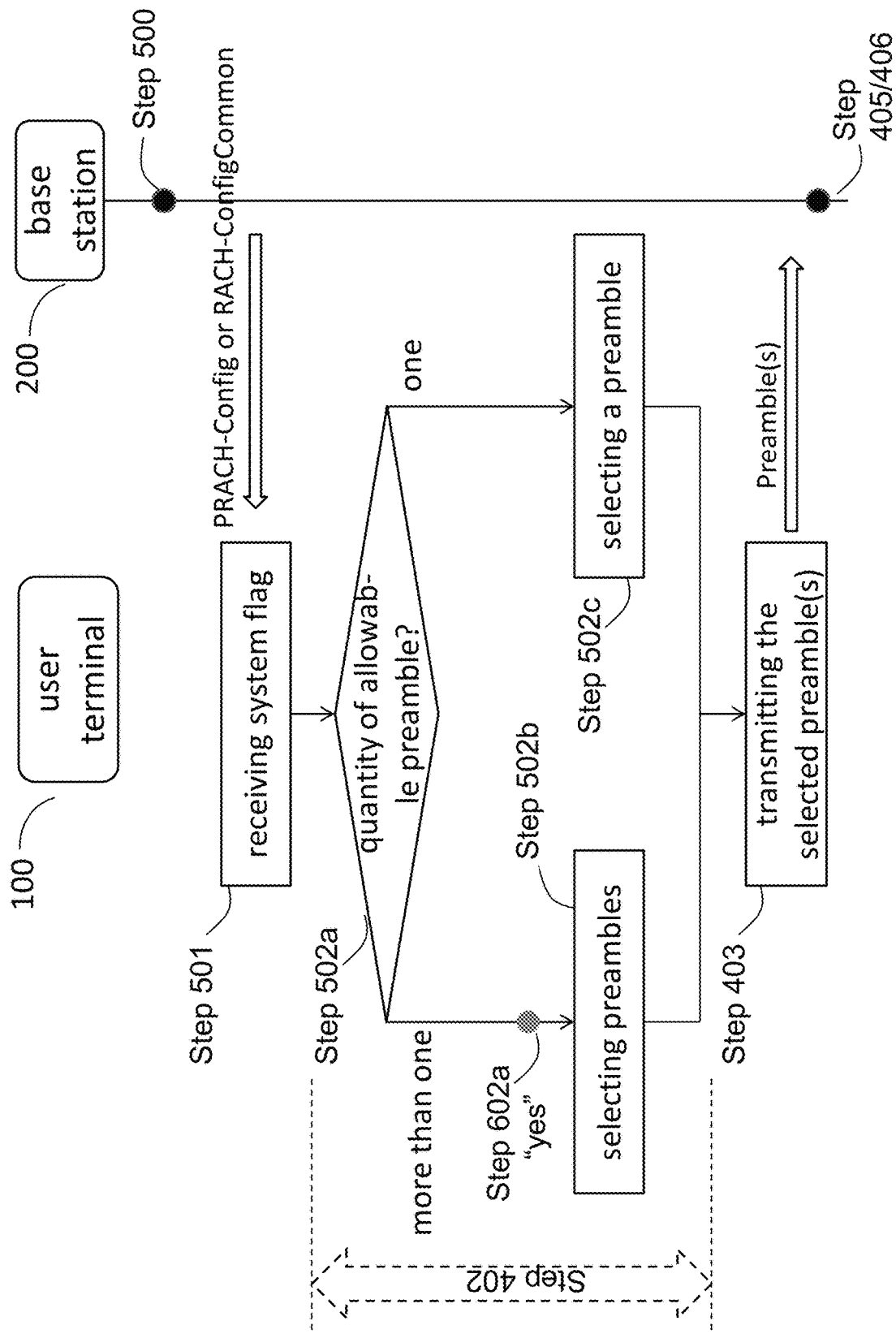

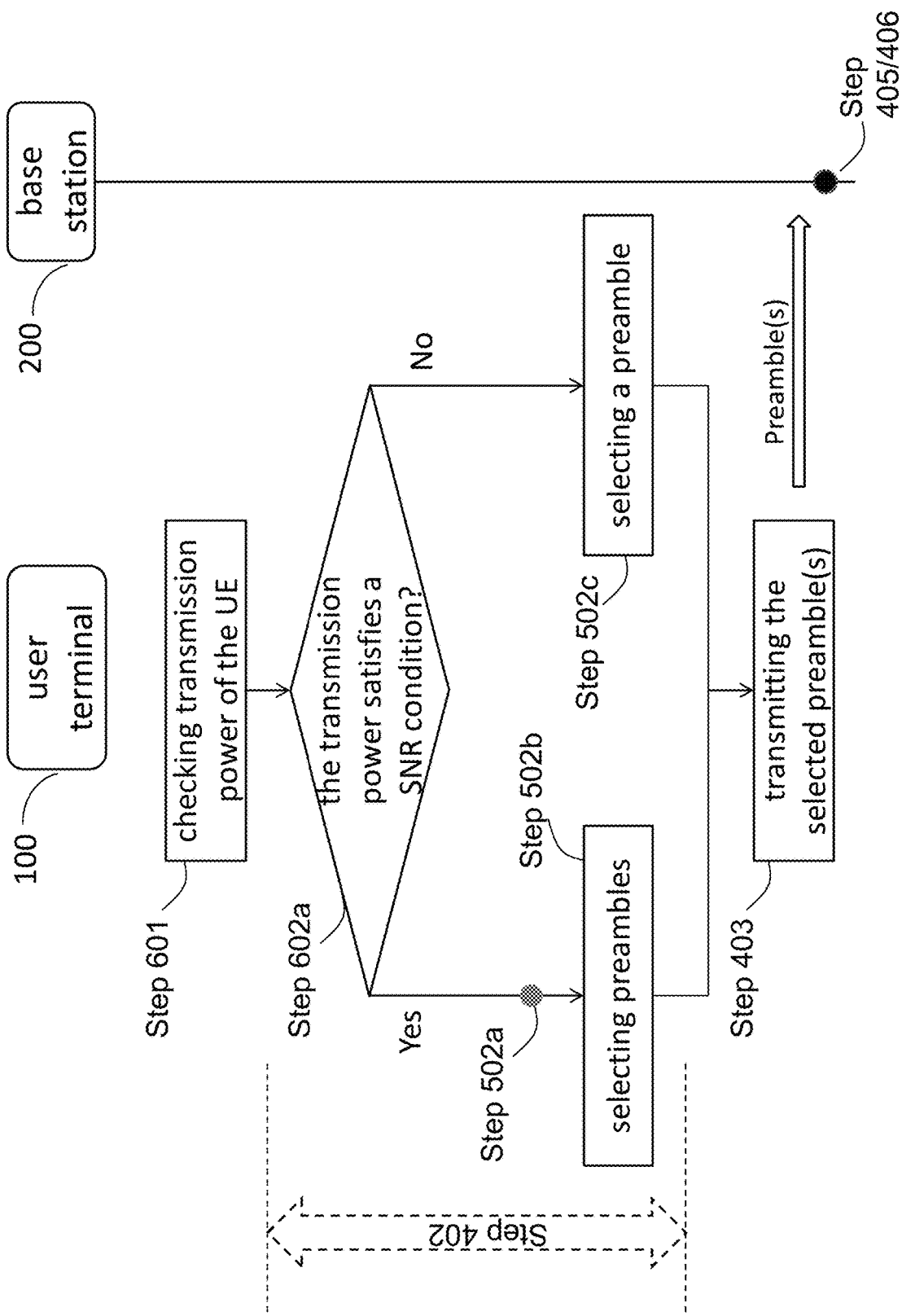

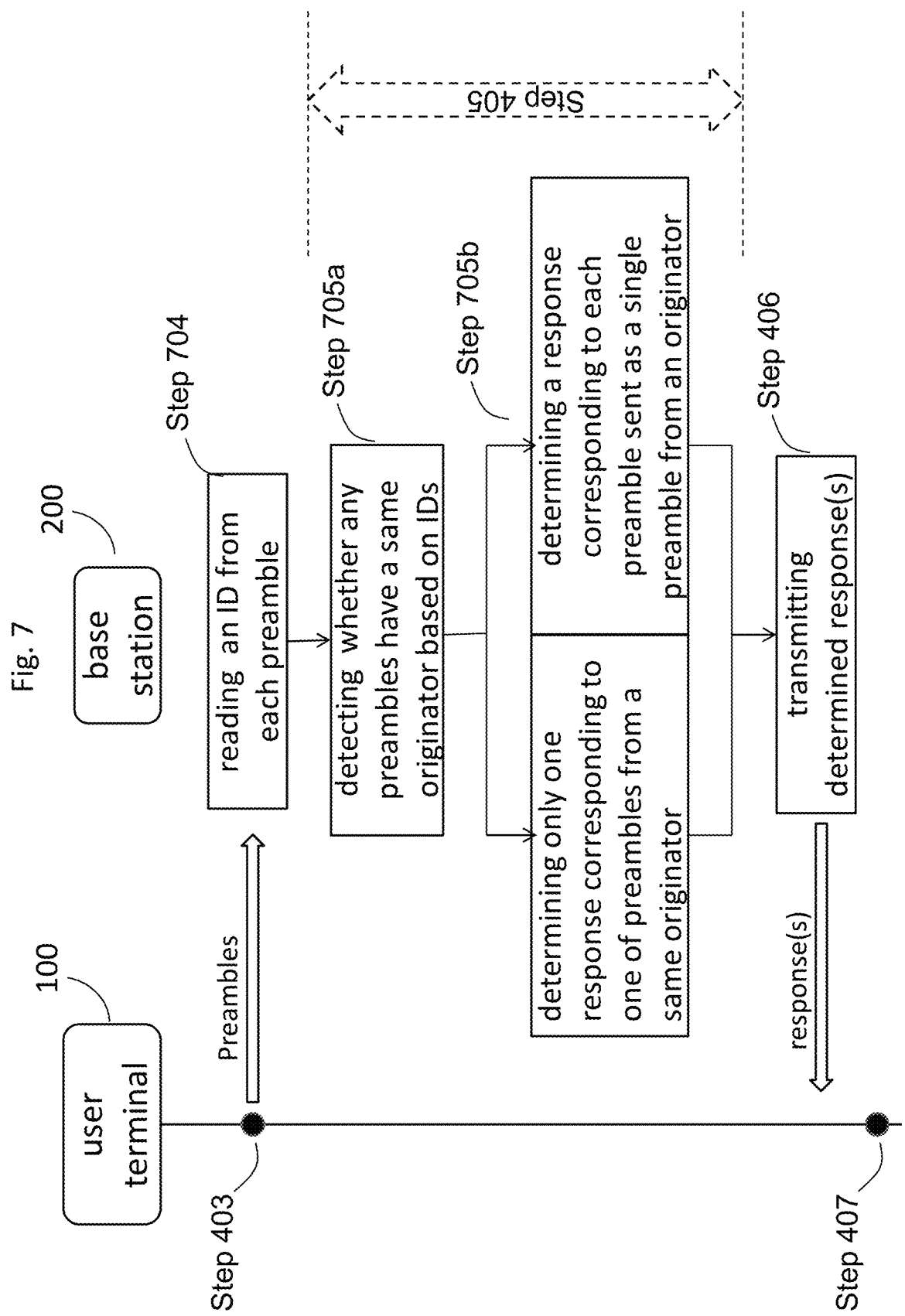

APPARATUS AND METHOD FOR TRANSMITTING TWO OR MORE PREAMBLES PER RACH ATTEMPT

CROSS REFERENCE TO RELATED APPLICATIONS

This application is a continuation of International Application No. PCT/RU2016/000819, filed on Nov. 28, 2016, the disclosure of which is hereby incorporated by reference in its entirety.

TECHNICAL FIELD

The present embodiments of the invention relate to an apparatus and a method for transmitting a preamble in a random access procedure.

BACKGROUND

In a long term evolution (LTE) system, a random access channel (RACH) is used for establishing uplink synchronization and sending a scheduling request (SR) if other resources for sending SR are not available.

There are 64 preambles used in RACH. They are obtained from one or several cyclically shifted Zadoff-Chu (ZC) sequences. Preambles obtained from a same ZC are preferred to non-orthogonal because they provide better detection performance. The quantity of preambles obtained from a same ZC sequence depends on a cyclic shift offset $N_{cs}$. Third Generation Partnership Project (3GPP) standard 36.211 lists all possible values of $N_{cs}$. $N_{cs}$ is selected as small as possible, but large enough to guarantee orthogonality in a presence of delay spread and time uncertainty of unsynchronized user terminals. Preambles obtained by cyclically shifting different ZC sequences are not orthogonal and are used only when there are not enough preambles generated from the same ZC sequence.

For larger cells, $N_{cs}$ is larger than that for smaller cells, and fewer preambles can be generated based on the same ZC sequence. Therefore, in larger cells the probability that two user terminals choose non-orthogonal preambles is higher than that in smaller cells. Calculations show that for cells whose radius are smaller than 0.79 km all preambles can be generated from the same ZC, while four ZC sequences must be used for a cell of 5.5 km. (See, LTE—The UMTS Long Term Evolution From Theory to Practice, Second Edition).

In a contention-free random access procedure, an Evolved Node B (eNodeB) assigns preambles to user terminals and collision can be avoided. In a contention-based random access procedure, a user terminal randomly chooses a preamble when attempting to establish a radio connection with a radio access network through a base station, for example an eNodeB, namely to access an eNodeB. Collision is a probabilistic event in the contention-based random access procedure. For example, when two user terminal chooses a same preamble and send it on a same RACH to an eNodeB, the eNodeB is not able to distinguish whether this preamble is originated from only one user terminal or not. The eNodeB sends a random access response (RAR) carrying uplink grant for a message 3 and a temporary Cell Radio Network Temporary Identifier (C-RNTI), which can be decoded by both user terminals. A collision occurs when both user terminals transmit message 3 on the same time-frequency resources and scrambled by the same temporary C-RNTI. Both or one of the two user terminals may fail to access the eNodeB because of the collision.

In conventional systems, the probability of collision depends on the quantity of available preambles, which is not more than 64, and an average number of random access channel (RACH) attempts per time unit, namely RACH load. The time unit may be a second or a time frame or a certain milliseconds. If the quantity of available preambles cannot be increased, the collision probability increases as long as the RACH load increases. An operating point for collision probability is usually assumed to be 1%. Therefore, in the case that the RACH load may increase, the only way to reduce the collision probability is to reserve more time-frequency resources to the RACH. In other words, with a same reserved time-frequency resources, more user terminals cannot successfully access the base station.

SUMMARY

An object of the present embodiments of the invention is to provide an apparatus and a method for transmitting a preamble in a random access procedure so as to increase a user terminal's probability of a successful access.

The above-mentioned object of the present embodiments of the invention is achieved by the solution provided in the independent claims. Further, implementations are defined in the dependent claims. Therefore, the collision probability is reduced without increasing time-frequency resources reserved to the RACH.

A first aspect of the present embodiments of the invention provides a user terminal, comprising:

a transmitter, configured to transmit two or more preambles to access a base station for example on a selected RACH in a contention-based random access procedure; where the term "to access a base station" can mean an access attempt within a single random access procedure;

a receiver, configured to receive a random access response (RAR) from the base station for example on a physical downline control channel (PDCCH), wherein the RAR is a response of the preambles transmitted by the transmitter.

More than one preamble is transmitted by the user terminal in a contention-based random access procedure. In this way, the user terminal has a lower probability to transmit exact preambles that other user terminals transmit. This helps the user terminal efficiently avoid a collision with other user terminals in the random access procedure. Therefore, the user terminal has a higher probability of a successful access.

In a first embodiment of the user terminal according to the first aspect, the user terminal further comprises:

a processor, configured to make a decision on a quantity of the preambles to be transmitted. For example, the quantity of the preambles is two, three, four, or more.

Different quantities of preambles may be determined by the user terminal. This provides the user terminal more chances to change the preambles that could be transmitted. The flexibility of selecting a changeable quantity of preambles can improve a performance of the user terminal on the access to a network. The network may refer to an access network controlled by the base station.

In a second embodiment of the user terminal according to the first embodiment of the first aspect, the decision is made based on a notification from the base station, the notification being used to indicate whether the base station allows a transmission of more than one preamble. Further, the transmitter is configured to transmit the preambles to the base station if the notification indicates an allowance of the transmission of more than one preamble. For example, the notification is a system flag, preferrablly set in a PRACH- Config message or a RACH-ConfigCommon message, being transmitted by the base station.

The notification from the base station can be considered when the user terminal determines the quantity of the preambles. The determination of the user terminal is under control of the base station. Therefore, an operator can adjust performance of the whole system by providing different strategies to the base station that transmits different notifications accordingly.

In a third embodiment of the user terminal according to the first embodiment of the first aspect, the decision is made based on a transmission power of the user terminal. The transmission power of the user terminal may be calculated in a way the same as prior art. Further, the transmitter is configured to transmit the preambles to the base station if the transmission power of the user terminal satisfies a predetermined target signal-to-noise ratio (SNR) at the base station.

For a cell-edged user terminal, there might be a limited quantity of transmitted preambles in a random access procedure. When the transmission power of the user terminal is considered, the user terminal can determine how many preambles can be supported. In this way, a more appropriate decision on the quantity of the preambles can be made, which may help the user terminal have more chances to successfully access the base station.

In a fourth embodiment of the user terminal according to the first aspect and any previous embodiment of the first aspect, the processor is configured to randomly choose the different preambles from a set of available preambles. The set may include no more than 64 available preambles. The preambles may be grouped in several subsets in advance. That is, the set may include several subsets of available preambles. A quantity of preambles in each subset is the same as the quantity determined by the processor.

By dividing the set of available preambles into subsets whose quantity is the determined quantity of the preambles, it is more efficient for the user terminal to select preambles.

In a fifth embodiment of the user terminal according to the first aspect and any previous embodiment of the first aspect, the transmitter is configured to transmit the preambles in the same time-frequency resources, the preambles being different from each other.

If there are more different preambles selected, the user terminal has more chances to avoid a collision with other user terminal in a random access procedure.

In a sixth embodiment of the user terminal according to the first aspect and any previous embodiment of the first aspect, the RAR received by the receiver is a single RAR, wherein the single RAR is defined by corresponding to only one of the preambles transmitted by the transmitter.

In a scenario where only one RAR is transmitted between the base station and each user terminal, a signalling overhead is reduced. Therefore, more resources of the network can be saved.

In a seventh embodiment of the user terminal according to the sixth embodiment of the first aspect, the processor is configured to check whether a preamble identifier (ID) obtained from the single RAR is the same as one of the IDs of the preambles transmitted by the transmitter. The transmitter is configured to, when the preamble ID obtained from the single RAR is the same as one of the IDs of the preambles transmitted by the transmitter, transmit a message, in particular a Message 3, in response to the RAR.

Because more than one preamble is transmitted, the user terminal needs to compare the preamble ID in the RAR with each of the preamble IDs corresponding to the transmitted preambles. The user terminal can determine that whether it is the pro-posed receiver of the RAR when all the preamble IDs of the transmitted preambles are compared.

In an eighth embodiment of the user terminal according to the first aspect and any one of the first to the fifth embodiment of the first aspect, a quantity of the RAR received by the receiver is the same as the quantity of the preambles transmitted by the transmitter, wherein each RAR corresponds to one different preamble.

The base station can respond each preamble that the user terminal transmits. Therefore, the implementation can be more compatible with existing systems because a mechanism of responding to the preamble in a base station in existing systems can be reused for the present embodiments of the invention.

In a ninth embodiment of the user terminal according to the eighth embodiment of the first aspect, the processor is configured to check whether a preamble ID obtained from each RAR is respectively the same as an ID of one of the preambles transmitted by the transmitter. The transmitter is configured to, when the preamble IDs obtained from the received RARs are respectively the same as the ID of one of the preambles transmitted by the transmitter, transmit a message, in particular a Message 3, in response to each received RAR.

When more than one preambles transmitted by the user terminal are responded by the base station, the user terminal may have more chances to successfully access the base station.

A second aspect of the present embodiments of the invention provides a base station, comprising:

a receiver, configured to receive two or more preambles from a user terminal attempting to access the base station, for example on a RACH in a contention-based random access procedure of the user terminal;

a processor, configured to determine a random access response (RAR) to be transmitted based on the received preambles; and a transmitter, configured to transmit the determined RAR to the user terminal in response to the received preambles.

More preambles are transmitted by a user terminal in a contention-based random access procedure towards the base station. In this way, there is a lower probability to have exact preambles transmitted by different user terminals. A collision between user terminals in the random access procedure can be efficiently avoided. Therefore, each user terminal has a higher probability of a successful access.

In a first embodiment of the base station according to the second aspect, the transmitter is configured to notify, for example the user terminal, whether a transmission of more than one preamble is allowed. For example, a notification such as a system flag transmitted to notify the user terminal.

The notification can help the base station flexibly control how the user terminal determines the quantity of the preambles. Therefore, an operator can adjust performance of the whole system by providing different strategies to the base station that transmits different notifications accordingly.

In a second embodiment of the base station according to the first embodiment of the second aspect, the processor is configured to determine whether the transmission of more than one preamble is allowed based on a comparison between an average number of random access channel (RACH) attempts per time unit, for example per second, per time frame or per certain milliseconds, on the base station, namely an RACH load, and a predefined threshold.

The working condition of the base station such as a RACH load can be considered when determining the notification. In this way, the determined notification can help guarantee performance of the base station and the whole system.

In a third embodiment of the base station according to the first or the second embodiment of the second aspect and according to the second aspect, the processor is configured to detect whether any of the received preambles are sent from one same user terminal. The processor is configured to determine only one RAR to be transmitted to the user terminal if any of the received preambles are sent from the same user terminal. For example, the only one RAR corresponds to only one preamble received from said same user terminal.

A judgment on the origin of each preamble can reduce the responses that the base station has to transmit. This also reduces necessary receiving and reading steps of the user terminal. Therefore, both the base station and the user terminal can save power consumption accordingly.

A third aspect of the present embodiments of the invention provides a transmission method of a user terminal, comprising:

transmitting, by the user terminal, two or more preambles to access a base station;

receiving, by the user terminal, a random access response (RAR) from the base station, wherein the RAR is a response of the preambles transmitted by the transmitter.

A fourth aspect of the present embodiments of the invention provides a transmission method of a base station, comprising:

receiving, by the base station, two or more preambles from a user terminal attempting to access the base station;

determining, by the base station, a random access response (RAR) to be transmitted based on the received preambles; and transmitting, by the base station, the determined RAR to the user terminal in response to the received preambles.

The method of the present embodiments of the invention achieves the same advantages as described above for the apparatus. The method may be carried out with additional method steps, which correspond to the functions carried out by the various embodiments described above for the apparatus.

A fifth aspect of the present embodiments of the invention provides a system comprising a user terminal according to the first aspect of the present embodiments of the invention and a base station according to the second aspect of the present embodiments of the invention.

A sixth aspect of the present embodiments of the invention provides a computer program comprising a program code for performing, when running on a computer, the method according to the first aspect of the present embodiments of the invention or the second aspect of the present embodiments of the invention.

BRIEF DESCRIPTION OF DRAWINGS

The above aspects and embodiments of the present embodiments of the invention will be explained in the following description of specific embodiments in relation to the enclosed drawings, in which

FIG. 3 shows a block diagram of a system according to an embodiment of the present invention.

FIG. 4a and FIG. 4b show block diagrams of two alternative methods according to an embodiment of the present invention.

FIG. 5 and FIG. 6 show block diagrams of alternative processing methods of a user terminal cooperating with a base station according to an embodiment of the present invention.

FIG. 7 shows a block diagram of a processing method of a base station cooperating with a user terminal according to an embodiment of the present invention.

DETAILED DESCRIPTION OF EMBODIMENTS

Figure 1:
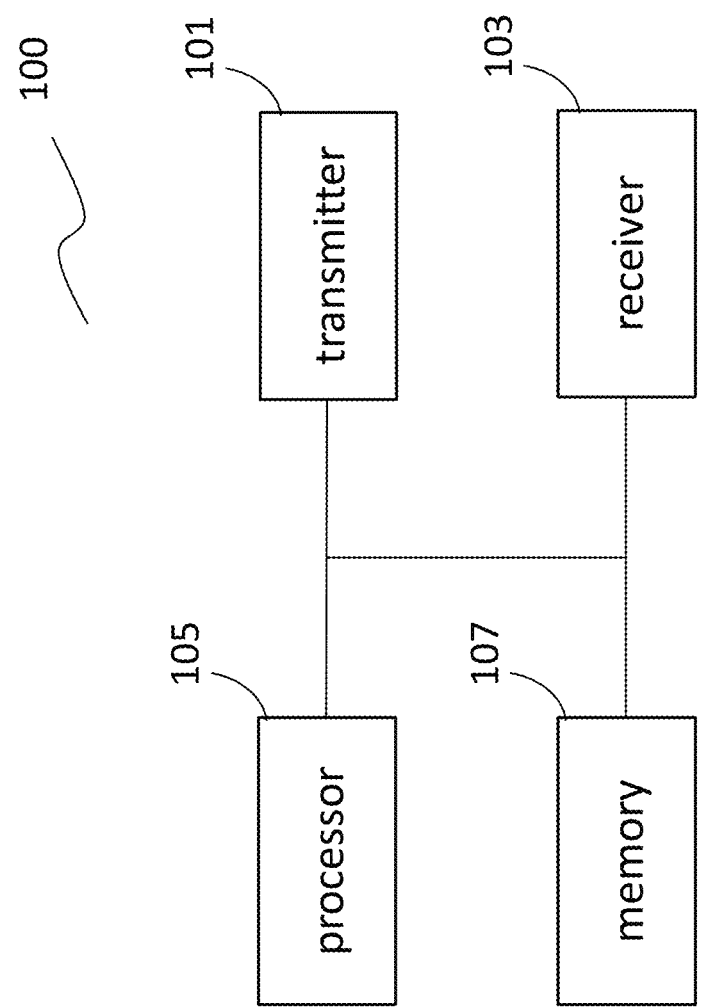
FIG. 1 shows a block diagram of a user terminal according to an embodiment of the present invention.

FIG. 1 shows a user terminal 100 according to an embodiment of the present invention for transmitting a random access preamble, usually referred to as a preamble for short. The user terminal 100 may be any user device being able to support a transmission of a preamble with a base station in a contention-based random access procedure.

As shown in FIG. 1, the user terminal 100 may include a transmitter (Tx) 101, a receiver (Rx) 103, a processor 105 and a memory 107. A data bus (not shown in FIG. 1) connects these elements in the user terminal 100. The transmitter 101 and the receiver 103 may be combined as a transceiver 302 as shown in FIG. 3. The transmitter 101, the receiver 103 or the transceiver 302 may connect one or more antennas. The memory 107 may include a computer program code for performing, when running on a computer, the method of the user terminal 100 in the present embodiments of the invention.

Figure 2:
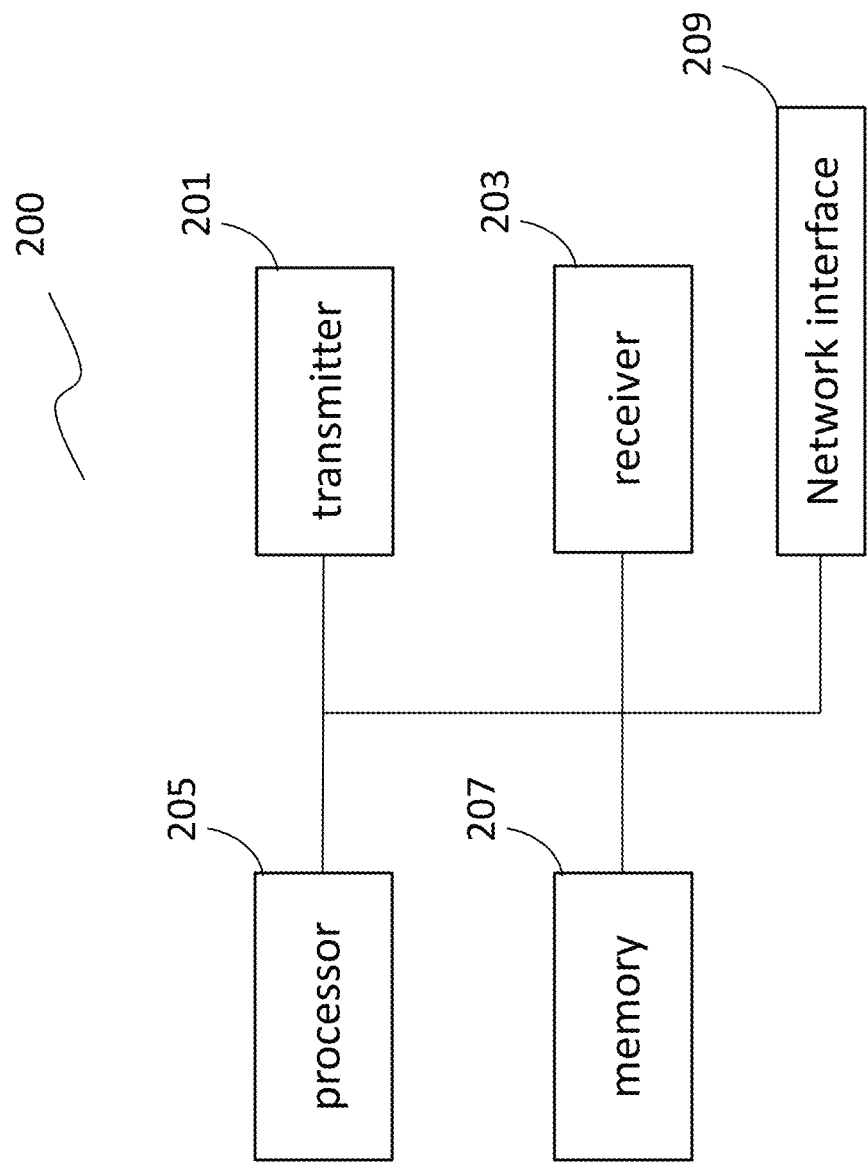
FIG. 2 shows a block diagram of a base station according to an embodiment of the present invention.

FIG. 2 shows a base station 200 according to an embodiment of the present invention for receiving a random access preamble. The base station 200 may be any access network device being able to support a transmission of a preamble with a user terminal in a contention-based random access procedure. In a Long Term Evoluation (LTE), LTE+ or a fifth generation (5G) system, the base station 200 can be an eNodeB.

As shown in FIG. 2, the base station 200 may include a transmitter (Tx) 201, a receiver (Rx) 203, a processor 205 and a memory 207. A data bus (not shown in FIG. 2) connects the elements in the user terminal 200. The transmitter 201 and the receiver 203 may be combined as a transceiver 304 as shown in FIG. 3. The transmitter 201, the receiver 203 or the transceiver 304 may connect one or more antennas. The memory 207 may include a computer program code for performing, when running on a computer, the method of the base station 200 in the present embodiments of the invention. The base station 200 may further include a network interface 209, which supports a connection between the base station 200 and a device in other networks, for example, a core network 300 as shown in FIG. 3. The network interface 209 may also support a connection between the base station 200 and other base stations through a wire or wireless link.

A communication system includes two apparatuses supporting a transmission of a preamble in a contention-based random access procedure. For example, as shown in FIG. 3, the communication system includes the user terminal 100 that transmits the preamble and the base station 200 that receives the preamble. The user terminal 100 and the base station 200 communicate with each other through a wireless link. The base station 200 communicates with a device, for example, a network control element (NCE), a mobility management element (MME) or a serving gateway (SGW), in the core network 300 through a wire link.

The elements in the user terminal 100 and/or the elements in the base station 200 can be configured to perform methods as shown in FIG. 4a and FIG. 4b. For example, the transmitter 101 of the user terminal 100 is configured to transmit information in step 403, step 407 and step 409, and the receiver 203 of the base station 200 is configured to receive the information in these steps. The transmitter 201 of the base station 200 is configured to transmit information in step 406 and step 408, and the receiver 103 of the user terminal 100 is configured to receive the information in these steps. Optionally, information transmitted in step 403 may be determined in step 402 performed by the processor 105 of the user terminal 100 according to a processing method as shown in FIG. 5 or FIG. 6. Information transmitted in step 406 may be determined in step 405 performed by the processor 205 of the base station 200 according to a processing method as shown in FIG. 7.

More details of the methods as shown in FIG. 4a and FIG. 4b are explained as follows.

As shown in FIG. 4a, in step 403, the user terminal 100 can be configured to transmit one preamble or several different preambles, for example two or more preambles, on a selected RACH in a single contention-based random access procedure. For example, if the user terminal 100 transmits two preambles. Both preambles are generated from a same ZC sequence based on different cyclic shifts, i.e., preamble IDs. Optionally, the quantity of the preambles to be transmitted in step 403 is determined by the user terminal 100 in step 402, which will be explained as shown in FIG. 5 and FIG. 6 later.

The base station 200 can be configured to respond to the user terminal 100 in step 406 if any preamble is successfully detected. Optionally, the base station 200 may send a single RAR or more than one RAR on a PDCCH. Optionally, the quantity of the RARs returned from the base station 200 in step 406 is determined by the base station 200 in step 405, which will be explained as shown FIG. 7 below.

Optionally, step 405 may be absent as shown in FIG. 4b. When there is no step 405, the base station 200 may send one or more RARs where the quantity of the RARs is the same as that of the preambles received from the user terminal 100. That is, the base station 200 responds one RAR to each received preamble.

RAR may contain a preamble identifier (ID), which is technically a preamble index, for example a cyclic shift, corresponding to the detected preamble, and a random access radio network temporary identifier (RA-RNTI) identifying in which time-frequency resources the preamble was detected. The RAR may carry an uplink grant configured for the user terminal 100 to transmit a potential response (for example, a message 3), a temporary cell radio network temporary identifier (C-RNTI), and timing adjustment.

The user terminal 100 can be configured to monitor PDCCH for RAR(s) identified by the RA-RNTI within a predefined time window, and if any RAR identified by the RA-RNTI is detected, transmit a response, for example a message 3, to the base station 200 in step 407. In an example, the user terminal 100 tries to detect RAR(s) corresponding to all the detected prambles that have been sent, and feedbacks a message 3 for each successfully detected RAR.

The message 3 may be transmitted on a uplink shared channel (UL-SCH) and carry either a C-RNTI of the user terminal 100 or an initial user terminal identity of the user terminal 100. The initial user terminal identity may be a System Architecture Evolution (SAE) temporary mobile subscriber identity (S-TMSI) or a random number. The message 3 may also carry a radio resource control (RRC) connection request, a tracking area update or a scheduling request. The message 3 may be scrambled by the temporary C-RNTI carried by the received RAR.

The base station 200 can be configured to transmit a contention resolution message to the user terminal 100 in step 408. The contention resolution message may be scrambled by the C-RNTI of the user terminal 100 or the temporary C-RNTI of the user terminal 100.

In the following two scenarios, the user terminal 100 can be configured to transmit an acknowledge (ACK) to the base station 200 as a confirmation of receiving the contention resolution message in step 409. The first scenario is that, the temporary C-RNTI of the user terminal 100 is used to scramble the contention resolution message transmitted by the base station 200, and the user terminal 100 recognizes the user terminal identity of the user terminal 100 contained in the detected contention resolution message. The second scenario is that, the user terminal 100 recognizes its C-RNTI contained in the detected contention resolution message. If the user terminal 100 fails to decode a detected contention resolution message, or the identity decoded from a detected contention resolution message is not that of the user terminal 100, the user terminal 100 does not transmit any feedback in response to the detected contention resolution message.

FIG. 5 and FIG. 6 show two different processing methods of the user terminal 100 that cooperates with the base station 200. The processing methods may be performed, in the system as shown in FIG. 3, before step 405 (if it exists), or step 406 as shown in FIG. 4a and FIG. 4b can be performed. How many preambles and which preambles are to be transmitted are determined by the user terminal 100 using the processing methods shown as FIG. 5 and FIG. 6.

As shown in FIG. 5, the user terminal 100 receives a notification from the base station 200 in step 501. The notification may indicate whether more than one preamble is allowable or not. Alternatively, the notification may specify the quantity of preambles allowed to be used. In a simplified example, it is predefined that the base station 200 cannot allow more than two preambles sent by one user terminal. When the notification indicates that more than one preamble is allowable, it only means that the quantity of the allowable preambles is 2. The notification may only occupy one bit. For example, One bit "1" indicates that more than one, which can be interpreted as especially two, preambles should be used by one user terminal in one random access procedure. One bit "0" or an absence of the notification indicates that only one preamble should be used by one user terminal in one random access procedure.

Step 500 may be optionally performed by the base station 200 to make a decision on the quantity of preambles that is allowable for a single user terminal to use in a single contention-based random access procedure. Then, in step 501 the base station 200 notifies the user terminal 100 of the decision, where the decision is indicated by the notification.

In an example of step 500, the decision is made based on an RACH load, i.e., an average number of RACH attempts per time unit, for example per second or per 10 millisecond, on the base station 200. If the RACH load does not exceed a predefined threshold, the decision is that more than one preamble is allowable for a single user terminal, e.g., the user terminal 100, to use in a contention-based random access procedure. If the RACH load exceeds the predefined threshold, i.e., the base station 200 is high loaded, the decision is that only one preamble is allowable. The RACH load may be measured by the base station 200. The predefined threshold may be (re)configured by the base station 200, for example according to the RACH load.

In another example of step 500, the decision is made based on the quantity of available preambles that the base station 200 (expects to) use. Assume that there are M available prambles, N is the quantity of allowable preambles, and there are k groups of allowable preambles that can be selected by the user terminal 100. When k is larger, there is lower probability for user terminals to select a same group of allowable preambles, which leads to a lower collision probability. Thus, the base station 200 may determine the quantity of allowable preambles according to following Equation (1). For example, the base station 200 takes M as an input, and checks which N can give a largest result of k.

$$k = \frac{M!}{(M-N)! * N!} \quad \text{Equation (1)}$$

A message may be selected by the base station 200 to carry the notification. For example, a PRACH-Config message or a RACH-ConfigCommon message in the art may be extended to carry the notification. It is efficient if the notification is broadcasted in the cell covered by the base station 200.

In step 502a, the user terminal 100 obtains the quantity of allowable preambles based on the received notification.

Assume that N is the quantity of allowable preambles. When N is 1, the user terminal 100 performs step 502c to select one preamble. When N is larger than 1, that is, at least 2, the user terminal 100 performs step 502b to select N preambles. A further judgement based on step 602a may be performed when N is larger than 1. If a result of the further judgement is "yes", that is, the transmission power of the user terminal satisfies a SNR condition, the user terminal 100 performs step 502b. The time at which the user terminal performs step 601 is not limited as far as that the user terminal 100 can perform the judgement based on step 602a accordingly.

In step 502b, the user terminal 100 may randomly and with equal probability select N preambles one by one from a set of available preambles until all the N preambles have been selected. For example, the N preambles at least include two different preambles.

The typical maximum quantity of available preambles is 64, while in practice only a part of the available preambles are reserved for a contention-based random access procedure and the other part of the available preambles are reserved for a contention-free random access procedure. In such a case, N is clearly no larger than 64.

If N is predefined and can be learned by the user terminal 100 in advance, the available preambles reserved for the contention-based random access procedure may be divided into several subsets, the quantity of the subsets is the same as the quantity of allowable preambles. That is, there are N subsets, each of which may preferably include almost the same quantity of available preambles. Therefore, when the user terminal 100 learns that more than one preamble is allowable, one preamble may be selected randomly and with equal probability by the user terminal 100 from each subset. The division of available preambles can efficiently guarantee that the selected preambles are different from each other.

In step 403, the selected preambles being multiplexed in the same time-frequency resources are transmitted. The resources are allocated by the base station 200.

As shown in FIG. 6, the user terminal 100 checks/calculates its transmission power in step 601 and judges whether its transmission power satisfies a signal-to-noise ratio (SNR) condition in step 602a. For example, the SNR condition is a target SNR at the base station 200. The transmission power and the target SNR at the base station 200 may be obtained/predetermined by the user terminal 100 according to the state of the art.

If the transmission power satisfies the SNR condition, the user terminal 100 may perform step 502b to select preambles, where the quantity of the selected preambles is predefined. In an example, when the transmission power satisfies the SNR condition, the user terminal 100 may perform a further judgement based on step 502a so as to obtain the quantity of allowable preambles according to the notification from the base station 200. When the quantity of allowable preambles is larger than 1, the user terminal 100 performs step 502b. The time at which the user terminal performs step 501 is not limited as far as the user terminal 100 can perform the judgement based on step 502a in time.

If the transmission power cannot satisfy the SNR condition, for example, the user terminal 100 is cell-edged, the user terminal 100 may perform step 502c to select a preamble.

FIG. 7 shows a processing method of the base station 200 that cooperates with the user terminal 100. The processing method may be performed, in the system as shown in FIG. 3, before step 407 as shown in FIG. 4a and FIG. 4b can be performed. Response(s) corresponding to the received preambles are determined by the base station 200 using the processing methods shown as FIG. 7.

In step 704, the base station 200 obtains a preamble ID from each received preamble.

In step 705a, the base station 200 detects whether any received preambles have a same originator or not. For example, some implicit attributes, such as a propagation channel, time offset and etc., can be determined from the received preamble. Assume that the user terminal 100 transmits two preambles with different preamble IDs. The base station 200 can find that the two preambles are originated from the user terminal 100 according to the attributes.

If the base station 200 determines which preamble(s) are originated from a same user terminal in step 705a, the base station 200 may determine one response for each originator—not for each preamble in step 705b. For example, there are two preambles transmitted from a same originator, i.e., the user terminal 100, the base station 200 determines only one response for the user terminal 100. The only response may be corresponding to only one of the two different preambles. If there is one received preamble detected as a single preamble from one originator, i.e., no other received preamble has a same originator of this single preamble, the base station 200 determines one response corresponding to the single preamble for this originator.

The base station 200 may perform step 705a only when more than one preamble arrives on same time-frequency resources. Otherwise, the base station 200 may determine a response corresponding to each received preamble as prior art.

FIG. 8a to FIG. 8e show contention-based random access procedures of two user terminals according to the method shown as FIG. 4a and FIG. 4b.

Figure 8A:
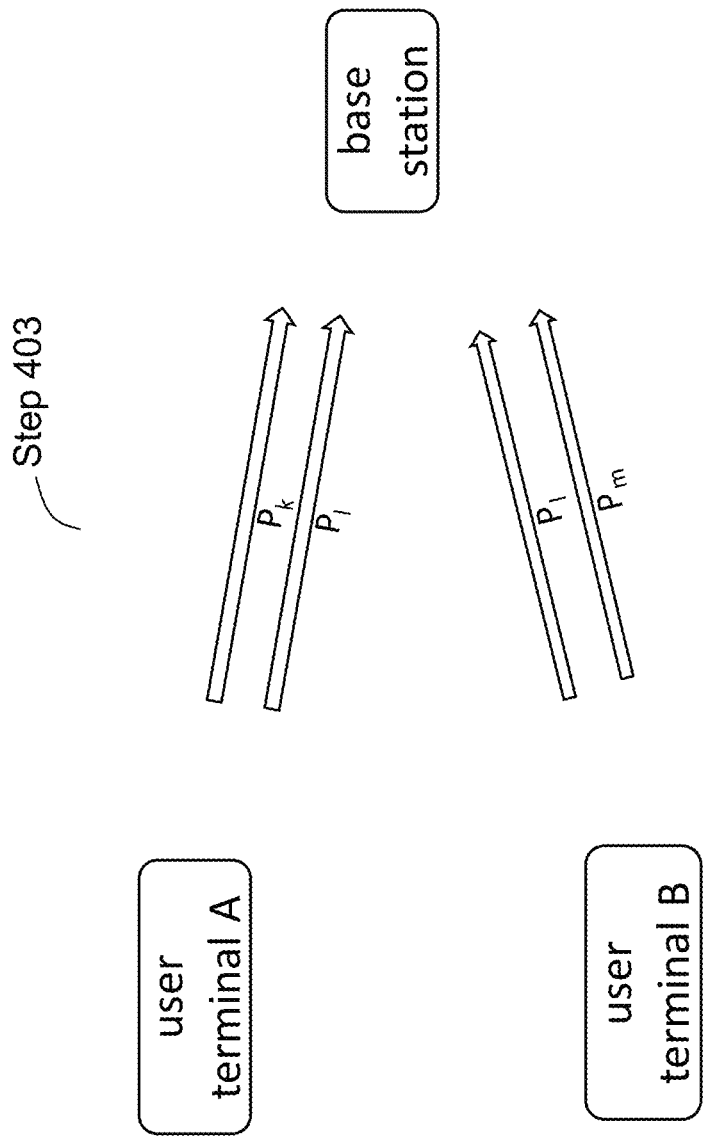
FIG. 8a, FIG. 8b, FIG. 8c, FIG. 8d and FIG. 8e show contention-based random access procedures of two user terminals according to an embodiment of the present invention.

FIG. 8a shows a communication according to step 403. Two preambles $P_k$ and $P_l$ are sent by the user terminal A to a base station. Two preambles $P_l$ and $P_m$ are transmitted by the user terminal B to the base station. The preambles $P_k$, $P_l$ and $P_m$ are transmitted on a same RACH. There are two preambles ($P_l$) transmitted respectively by user terminals A and B having a same preamble ID (l). However, the user terminals A and B are blind to this situation.

According to the method as shown in FIG. 4a, the base station distinguishes origins of each preamble and determines a single response to each origin in step 405. That is, in step 406, the base station transmits one response, for example $RAR_{-k}$, to the user terminal A and one response, for example $RAR_{-m}$, to the user terminal B. Because $RAR_{-k}$ and $RAR_{-m}$, carry different uplink grants for different user terminals, a collision between the user terminals' responses in step 407 can be avoided.

Figure 8B:
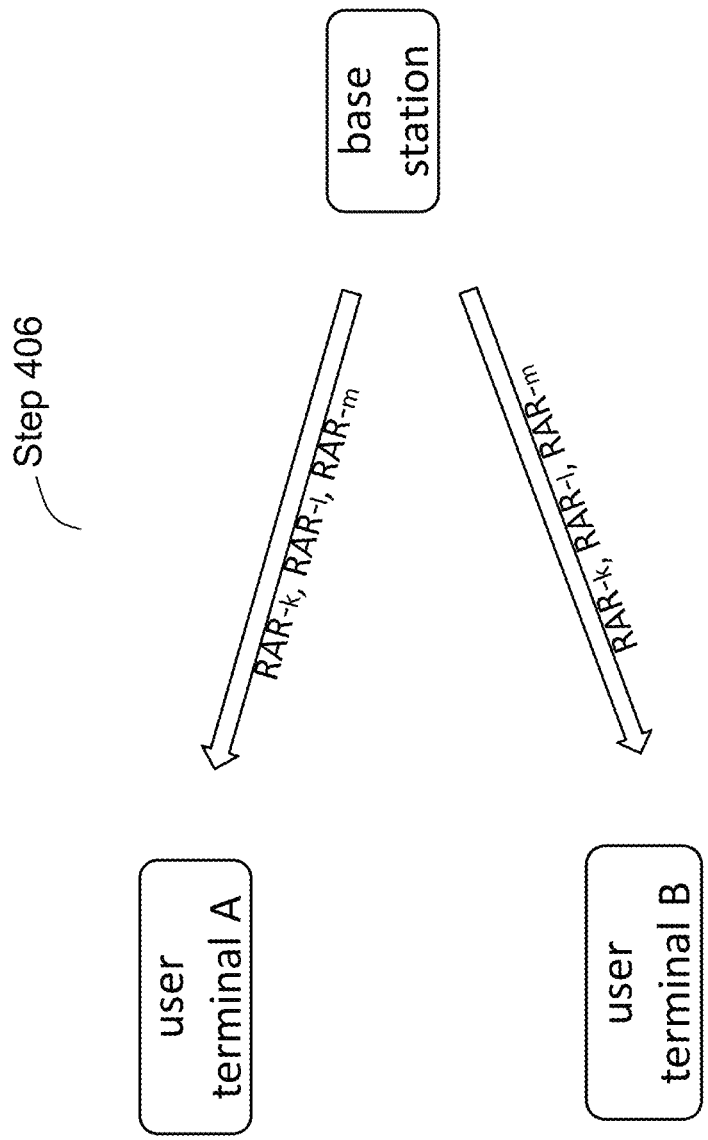

According to the method as shown in FIG. 4b, more than one RAR is transmitted by the base station. As shown in FIG. 8b, $RAR_{-l}$, $RAR_{-k}$ and $RAR_{-m}$ are transmitted in response to the preambles $P_k$ and $P_m$ in step 406.

Figure 8C:
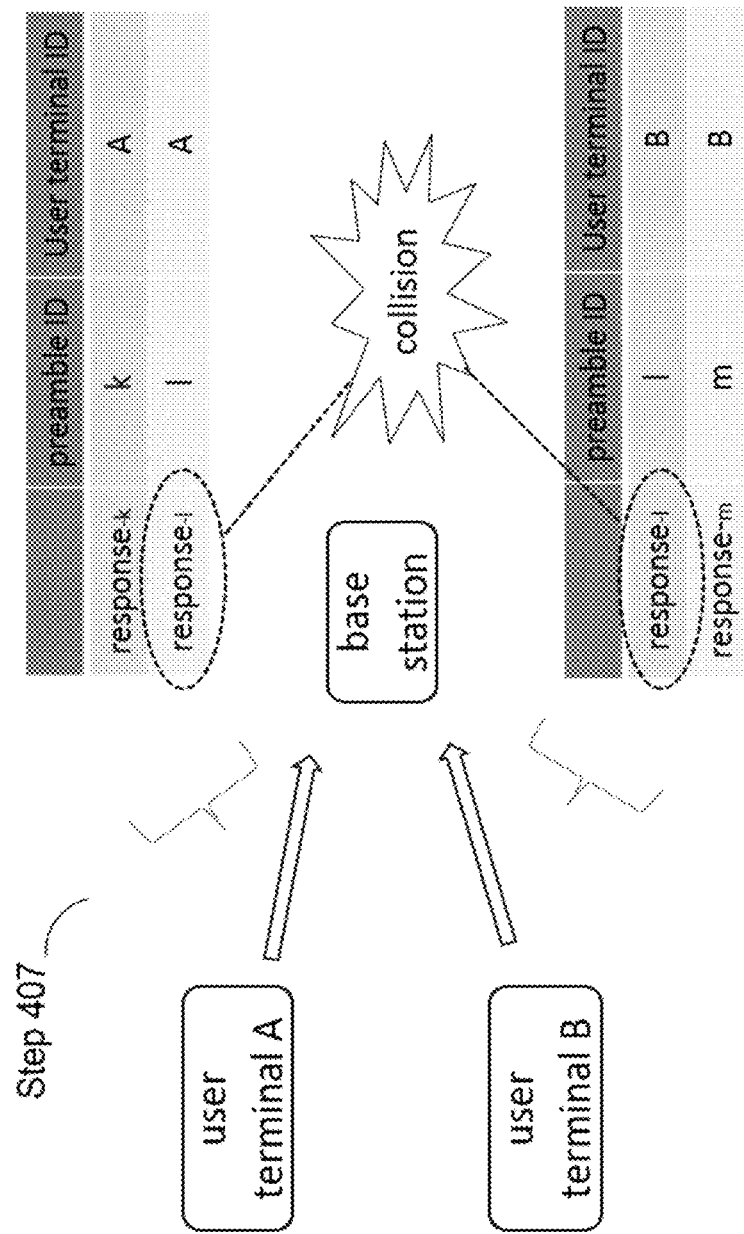

FIG. 8c shows a communication according to step 407. The user terminal A transmits response$_{-k}$ and response$_{-l}$ carrying its user terminal ID "A" in response to the received RARs ($RAR_{-k}$ and $RAR_{-l}$). The user terminal B transmits response$_{-l}$ and response$_{-m}$ carrying its user terminal ID "B" in response to the received RARs ($RAR_{-l}$ and $RAR_{-m}$). Because the user terminal A can determine that it has not transmitted the preamble ID "m" carried in $RAR_{-m}$, the user terminal A does not respond to $RAR_{-m}$. Similarly, the user terminal B does not respond to $RAR_{-k}$. There are two responses (i.e., response$_{-l}$) sent on same time-frequency resources because both user terminals A and B take an uplink grant and a temporary C-RNTI carried in $RAR_4$ as information specified for the user terminal itself. Assume that such a collision leads to a decoding failure of both $RAR_{-l}$. The base station cannot transmit a contention resolution message in response to any $RAR_{-l}$.

Figure 8D:
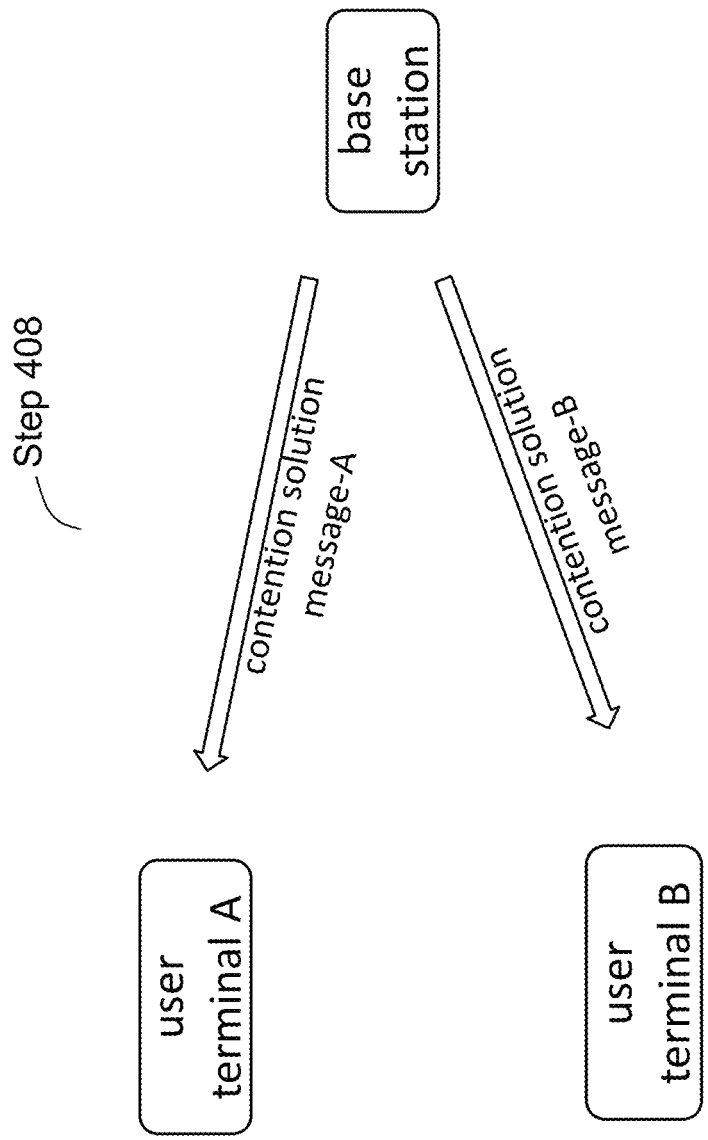

FIG. 8d shows a communication according to step 408. The base station transmits contention resolution message$_{-A}$ carrying a user terminal ID "A" in response to the received response$_{-k}$ and contention resolution message$_{-B}$ carrying a user terminal ID "B" in response to the received response$_{-m}$.

Figure 8E:
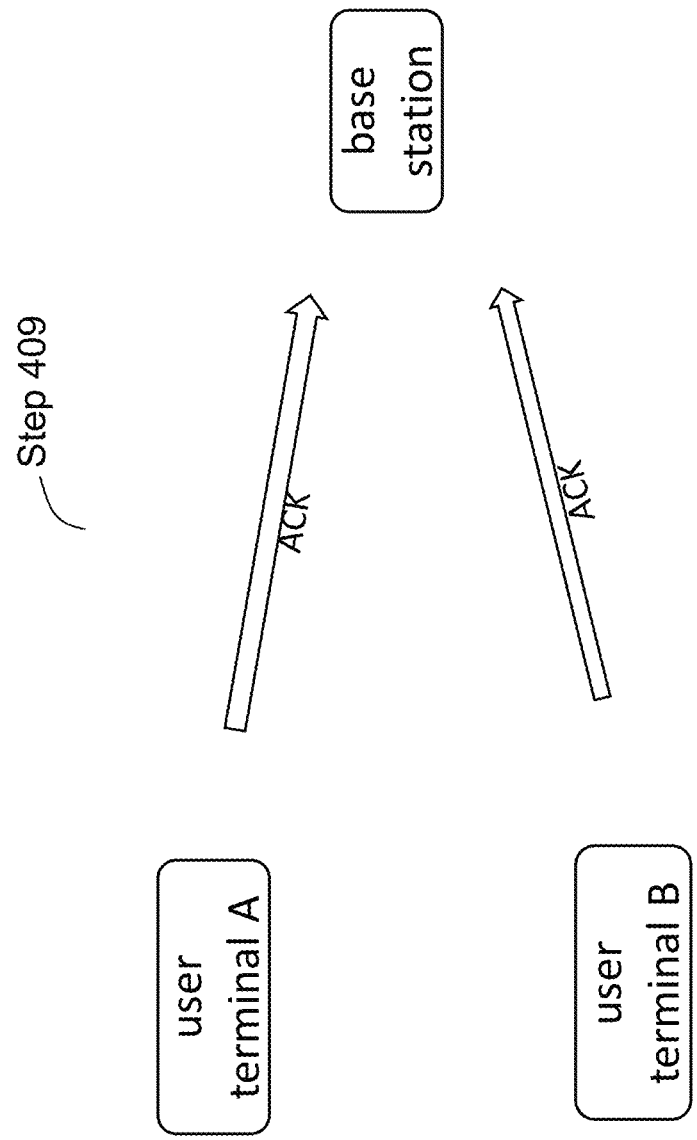

FIG. 8e shows a communication according to step 409. After correctly decoding the contention resolution message$_{-A}$ and detecting its own user terminal ID "A", the user terminal A transmits ACK to the base station. Similarly, the user terminal B also transmits ACK to the base station. Therefore, both user terminals A and B access the base station successfully.

Figure 9:
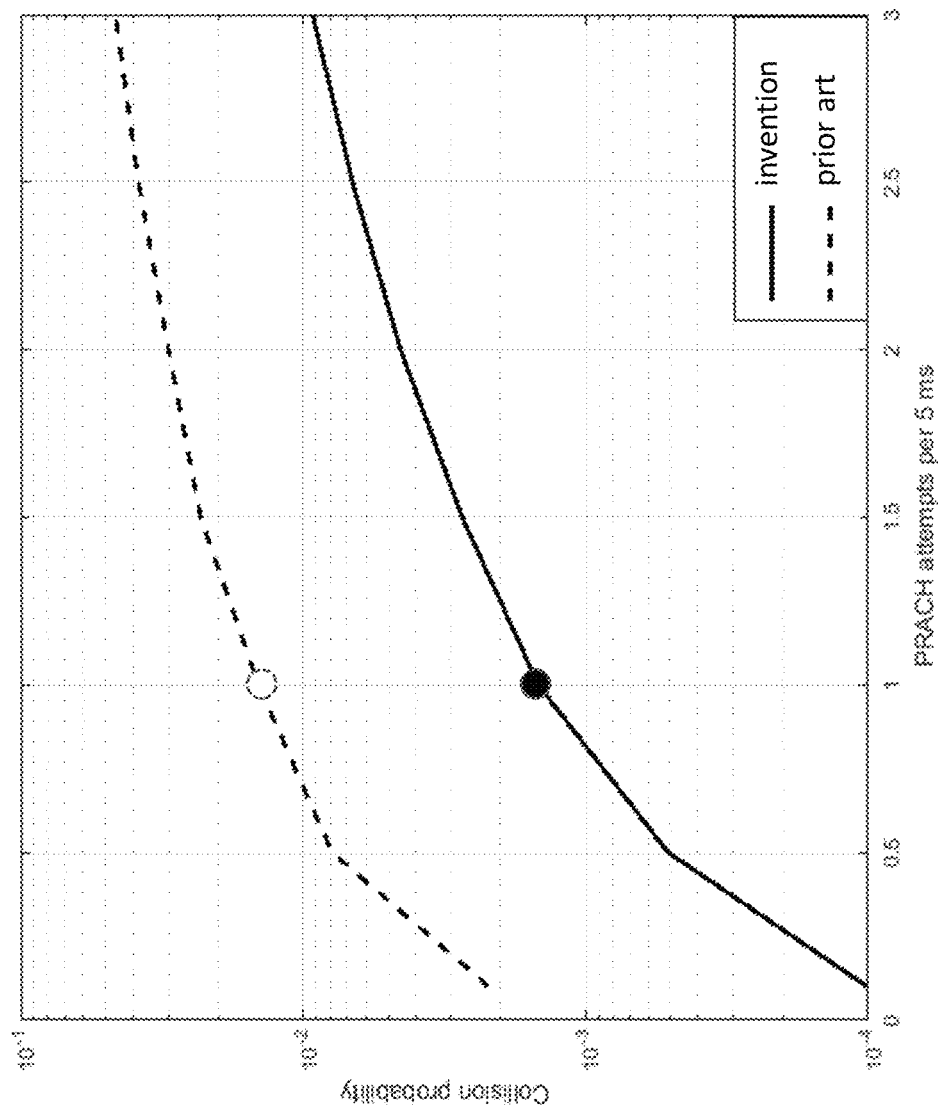
FIG. 9 shows statistics on a relation between a collision probability of preambles and a RACH load according to an embodiment of the present invention compared to the state of the art.

FIG. 9 shows statistics on a relation between a collision probability of preambles and a RACH load according to an embodiment of the present invention compared to the state of the art. The vertical axis shows a collision probability of preambles and the horizontal axis shows the RACH load assumed as RACH attempts per 5 milliseconds. That is, 5 milliseconds are considered as a time unit.

As shown in FIG. 9, it is assumed that there are 64 available preambles generated based on one ZC sequence, the collision probability in the present embodiment of the invention, where a user terminal transmits 2 allowable preambles in a contention-based random access procedure, can be reduced significantly compared to that in the state of the art. For example, when 1 RACH attempts per 5 milliseconds is chosen in FIG. 9, the collision probability in the state of the art is almost ten times of the collision probability using the method of the present embodiment of the invention.

Therefore, in the present embodiment of the invention, there is no need to reserve as many time-frequency resources as the state of the art to achieve a same collision probability, e.g., an operating point of the collision probability.

Figure 10:
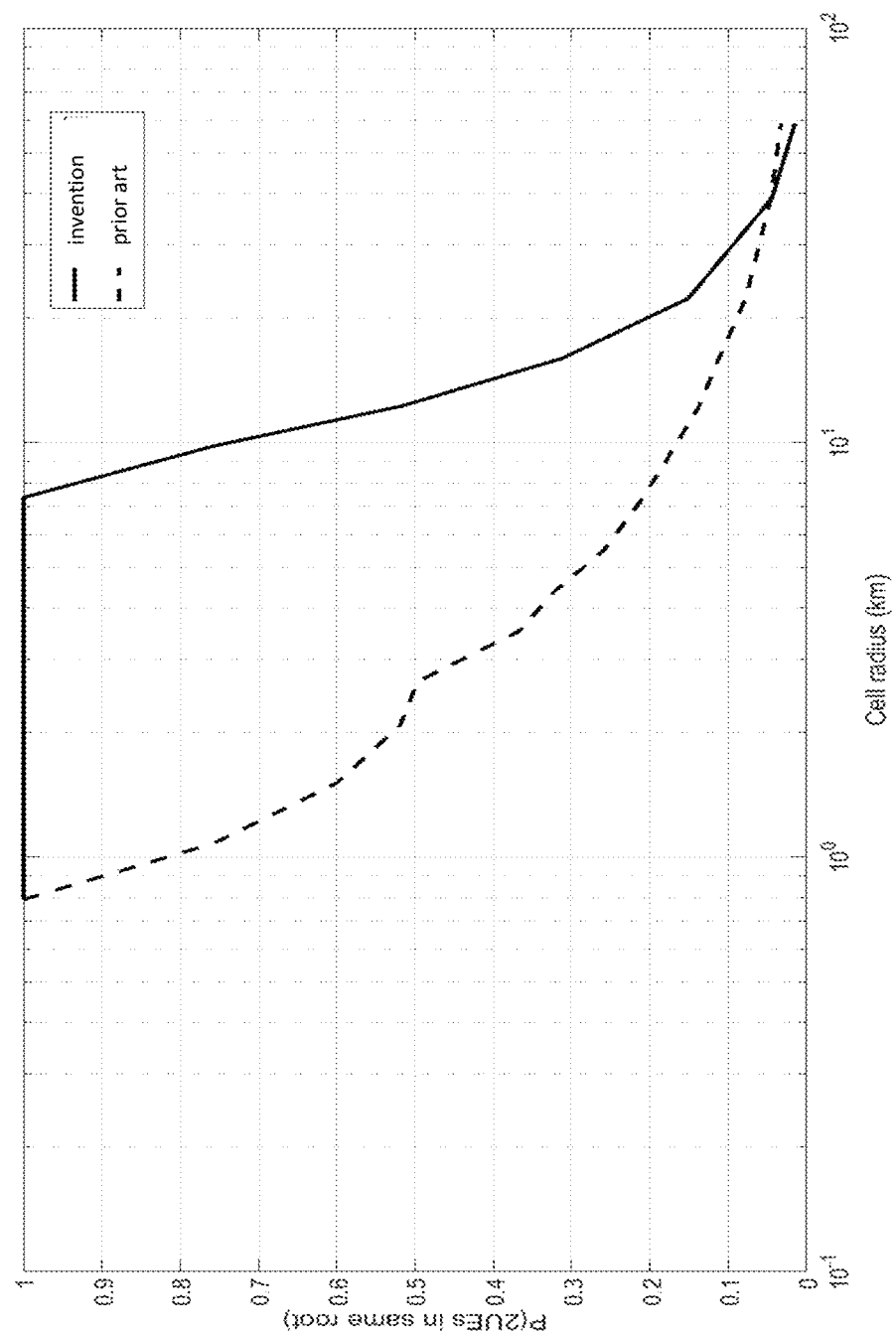
FIG. 10 shows statistics on a relation between a probability of preambles generated based on one root sequence and a cell radius according to an embodiment of the present invention compared to the state of the art.

FIG. 10 shows statistics on a relation between a collision probability of preambles and a cell radius according to an embodiment of the present invention compared to the state of the art. The vertical axis shows a probability that preambles selected by two user terminals are orthogonal, that is, a probability of the preambles generated based on one root sequence (e.g., ZC sequence) and different cyclic shifts. The horizontal axis shows the RACH load which is assumed as RACH attempts per 5 milliseconds.

As shown in FIG. 10, it is assumed that there are 64 available preambles generated based on one ZC sequence. A cell radius for which all the 64 preambles remain orthogonal in the present embodiment of the invention, where a user terminal transmits 2 allowable preambles in a contention-based random access procedure, can be increased significantly compared to that in the state of the art while the collision probability is not increased. For example, when the collision probability of 0.6% is chosen in FIG. 10, the cell radius using the method of the present embodiment of the invention is more than ten times of the cell radius in the state of the art.

Therefore, when there are the same available preambles, the present embodiments of the invention reduce collision probability for a same RACH load. That is, in a cell controlled by a base station, more user terminals can successfully access the base station in a contention-based random access procedure. When there are the same available preambles, the present embodiments of the invention further provide the same collision probability for a much higher RACH load. That is, a cell controlled by a base station can have a larger cell radius while the collision probability is not worse. Besides, in a cell of a fixed cell radius, in order to achieve a same collision probability, fewer available preambles are needed in the present embodiment of the invention compared to other techniques. That is, in the total 64 preambles, more preambles can be used for contention-free random access procedure.

The embodiments of the invention have been described in conjunction with embodiments including a user terminal and a base station. However, other applications can be understood and effected by those skilled in the art in practicing the claimed embodiments of the invention, from a study of the drawings, the disclosure, and the appended claims. A computer program may be stored or distributed on a suitable medium, such as an optical storage medium or a solid-state medium supplied together with or as part of other hardware, but may also be distributed in other forms, such as via the Internet or other wired or wireless telecommunication systems.

What is claimed is:

1. A user terminal, comprising:
   a receiver configured to receive a notification from a base station that indicates whether more than one preamble is allowable or not;
   a processor configured to determine that the notification indicates that more than one preamble is allowable;

a transmitter configured to transmit two or more preambles to access the base station; and wherein the receiver is configured to receive a random access response (RAR) from the base station, wherein the RAR is a response of the two or more preambles transmitted by the transmitter.

2. The user terminal according to claim 1, comprising: the processor configured to make a decision on a quantity of the preambles to be transmitted.

3. The user terminal according to claim 2, wherein the decision is made based on a transmission power of the user terminal; and wherein the transmitter is configured to transmit the preambles to the base station if the transmission power of the user terminal satisfies a target signal-to-noise ratio (SNR) at the base station.

4. The user terminal according to claim 1, wherein the processor is configured to randomly choose the two or more preambles from a set of available preambles.

5. The user terminal according to claim 1, wherein the transmitter is configured to transmit the two or more preambles in a same time-frequency resources, each of the two or more preambles being different from each other.

6. The user terminal according to claim 1, wherein the RAR received by the receiver is a single RAR, wherein the single RAR corresponds to only one of the two or more preambles transmitted by the transmitter.

7. The user terminal according to claim 6, wherein the processor is configured to check whether a preamble identifier (ID) obtained from the single RAR matches an ID of one of the two or more preambles transmitted by the transmitter; and wherein the transmitter is configured to, when the preamble ID obtained from the single RAR matches the ID of one of the two or more preambles, transmit a Message 3 in response to the RAR.

8. The user terminal according to claim 1, wherein a quantity of the RAR received by the receiver is the same as a quantity of the two or more preambles transmitted by the transmitter, wherein each RAR corresponds to a different preamble.

9. The user terminal according to claim 8, wherein the processor is configured to check whether a preamble ID obtained from each RAR is respectively the same as an ID of one of the two or more preambles transmitted by the transmitter; and wherein the transmitter is configured to, when the preamble IDs obtained from the received RARs are respectively the same as the ID of one of the two or more preambles transmitted by the transmitter, transmit the Message 3 in response to each received RAR.

10. A base station, comprising:

a processor configured to determine that a transmission of more than one preamble is allowed for a user terminal to use in a single contention-based random access procedure;

a transmitter configured to transmit a notification to the user terminal that indicates more than one preamble is allowable for the user terminal to transmit;

a receiver configured to receive two or more preambles from the user terminal attempting to access the base station;

the processor configured to determine a random access response (RAR) to be transmitted based on the received two or more preambles; and the transmitter configured to transmit the determined RAR to the user terminal in response to the received two or more preambles.

11. The base station according to claim 10, wherein the processor is configured to determine the transmission of more than one preamble is allowed based on a comparison between an average number of random access channel (RACH) attempts per time unit on the base station and a predefined threshold.

12. The base station according to claim 10, wherein the processor is configured to detect whether any of the received two or more preambles are sent from the user terminal; and wherein the processor is configured to determine only one RAR to be transmitted to the user terminal if any of the received two or more preambles are sent from the user terminal.

13. A transmission method performed by a user terminal, comprising:

receiving, by a receiver, a notification from a base station that indicates whether more than one preamble is allowable or not;

determining, by a processor, that the notification indicates that more than one preamble is allowable;

transmitting, by a transmitter, two or more preambles to access the base station; and receiving, by the receiver, a random access response (RAR) from the base station, wherein the RAR is a response of the two or more preambles transmitted by the transmitter.

14. The method according to claim 13, wherein the user terminal makes a decision on a quantity of preambles to be transmitted based on a transmission power of the user terminal, the method further comprising:

transmitting, by the transmitter, the preambles to the base station if the transmission power of the user terminal satisfies a target signal-to-noise ratio (SNR) at the base station.

15. The method according to claim 13, wherein the notification occupies one bit, wherein the one bit is set to 1 to indicate that more than one preamble is to be transmitted by the user terminal, and the one bit is set to 0 to indicate that one preamble is to be transmitted by the user terminal.

16. A transmission method of a base station, comprising:

determining, by a processor, that a transmission of more than one preamble is allowed for a user terminal to use in a single contention-based random access procedure;

transmitting, with a transmitter, a notification to the user terminal that indicates more than one preamble is allowable for the user terminal to transmit;

receiving, by a receiver, two or more preambles from the user terminal attempting to access the base station;

determining, by the processor, a random access response (RAR) to be transmitted based on the received two or more preambles; and transmitting, by the transmitter, the determined RAR to the user terminal in response to the received two or more preambles.

17. The method according to claim 16, wherein the base station determines that the transmission of more than one preamble is allowed based on a comparison between an average number of random access channel (RACH) attempts per time unit on the base station and a predefined threshold.

18. The method according to claim 16, wherein the notification occupies one bit, wherein the one bit is set to 1 to indicate more than one preamble is to be transmitted by the user terminal, and the one bit set to 0 to indicate that one preamble is to be transmitted by the user terminal.

19. A computer program product comprising:
a processor; and
a memory coupled to the processor and having processor-executable instructions stored thereon, which when executed by the processor, cause the processor to:
   receive a notification from a base station that indicates whether more than one preamble is allowable or not;
   determine that the notification indicates that more than one preamble is allowable;
   transmit two or more preambles to access the base station; and
   receive a random access response (RAR) from the base station, wherein the RAR is a response of the transmitted two or more preambles.

20. A computer program product comprising:
a processor; and
a memory coupled to the processor and having processor-executable instructions stored thereon, which when executed by the processor, cause the processor to:
   determine that a transmission of more than one preamble is allowed for a user terminal to use in a single contention-based random access procedure;
   transmit a notification to the user terminal that indicates that more than one preamble is allowable for the user terminal to transmit;
   receive two or more preambles from the user terminal attempting to access the base station;
   determine a random access response (RAR) to be transmitted based on the received two or more preambles; and
   transmit the determined RAR to the user terminal in response to the received two or more preambles.

* * * * *